United States Patent
Maurer et al.

(10) Patent No.: US 11,852,025 B2
(45) Date of Patent: Dec. 26, 2023

(54) TURBOMACHINE WITH DEVICE FOR COOLING AND PRESSURISING A TURBINE

(71) Applicant: SAFRAN AIRCRAFT ENGINES, Paris (FR)

(72) Inventors: Paco Maurer, Moissy-cramayel (FR); Fabien Roger Gaston Caty, Moissy-cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/760,173

(22) PCT Filed: Mar. 15, 2021

(86) PCT No.: PCT/FR2021/050424
§ 371 (c)(1),
(2) Date: Aug. 4, 2022

(87) PCT Pub. No.: WO2021/191523
PCT Pub. Date: Sep. 30, 2021

(65) Prior Publication Data
US 2023/0048118 A1  Feb. 16, 2023

(30) Foreign Application Priority Data
Mar. 24, 2020  (FR) ..................... 2002885

(51) Int. Cl.
*F01D 25/12*  (2006.01)
*F01D 5/08*   (2006.01)
(Continued)

(52) U.S. Cl.
CPC ............. *F01D 25/12* (2013.01); *F01D 5/081* (2013.01); *F01D 9/065* (2013.01); *F01D 17/141* (2013.01);
(Continued)

(58) Field of Classification Search
CPC .......... F01D 5/081; F01D 5/082; F01D 9/065; F01D 17/141; F01D 17/145; F01D 25/12;
(Continued)

(56) References Cited

U.S. PATENT DOCUMENTS 3,275,294 A * 9/1966 Allen ..................... F01D 5/081
                                                415/137
3,972,181 A   8/1976 Swayne
(Continued)

FOREIGN PATENT DOCUMENTS

CN   110359971 A * 10/2019 ............. F01D 25/12
EP   1632649 A2    3/2006
(Continued)

OTHER PUBLICATIONS

English machine translation of CN-110359971-A, Jun. 28, 2023.*
International Search Report received for PCT Patent Application No. PCT/FR2021/050424, dated Apr. 29, 2021, 6 pages (2 pages of English Translation and 4 pages of Original Document).

*Primary Examiner* — Christopher Verdier
(74) *Attorney, Agent, or Firm* — WOMBLE BOND DICKINSON (US) LLP

(57) ABSTRACT

A turbo machine including a device for ventilating and pressurising a turbine rotor of a turbomachine having an axis, the device including at least one collection pipe suitable for collecting a fraction of the air circulating in a high-pressure compressor of the turbomachine and conveying it to a first inner chamber inside the turbomachine that communicates with a second inner chamber delimited by the turbine rotor, the first and second chambers being at least partially separated by a stationary shroud having the axis, wherein it includes at least one injector passing through the stationary shroud and having a cross-section that varies in response to a pressure difference between the first and second chambers.

9 Claims, 4 Drawing Sheets

(51) Int. Cl.
  *F01D 17/14* (2006.01)
  *F01D 9/06* (2006.01)
  *F02C 9/18* (2006.01)
  *F02C 6/08* (2006.01)
  *F02C 3/13* (2006.01)

(52) U.S. Cl.
  CPC .............. *F01D 17/145* (2013.01); *F02C 6/08* (2013.01); *F02C 9/18* (2013.01); *F02C 3/13* (2013.01); *F05D 2260/20* (2013.01); *F05D 2270/3015* (2013.01); *F05D 2300/50212* (2013.01)

(58) Field of Classification Search
  CPC ......... F05D 2260/20; F05D 2270/3015; F05D 2300/50212; F02C 6/08; F02C 7/18; F02C 7/185; F02C 9/18; F02C 9/20; F02C 3/13
  See application file for complete search history.

(56) References Cited

U.S. PATENT DOCUMENTS

| | | | | |
|---|---|---|---|---|
| 4,456,427 A | * | 6/1984 | Evans | F01D 5/081 415/115 |
| 7,445,424 B1 | * | 11/2008 | Ebert | F01D 5/081 415/113 |
| 2017/0314465 A1 | * | 11/2017 | Beutin | F02C 7/185 |
| 2020/0308977 A1 | * | 10/2020 | Ekra Devalere | F01D 11/24 |
| 2022/0065130 A1 | * | 3/2022 | Fontanel | F01D 5/082 |

FOREIGN PATENT DOCUMENTS

| | | |
|---|---|---|
| FR | 3061739 A1 | 7/2018 |
| FR | 3072414 A1 | 4/2019 |
| GB | 2246836 A | 2/1992 |
| WO | 2015/026597 A1 | 2/2015 |

\* cited by examiner

TURBOMACHINE WITH DEVICE FOR COOLING AND PRESSURISING A TURBINE

TECHNICAL FIELD OF THE INVENTION

The present invention relates to a device for cooling a turbomachine turbine, such as a turbojet engine.

TECHNICAL BACKGROUND

A turbomachine generally comprises a high-pressure turbine and a low-pressure turbine located from upstream to downstream in an annular internal duct of flow of a gas stream of the turbomachine, each of which comprises a moving vane bearing rotor.

Each turbine comprises one or more vane bearing annular stages. Distribution means comprising stationary vanes or distributors designed to rotate the gas stream in the duct are arranged between the high- and low-pressure turbines and, when a turbine comprises more than one stage, between its stages.

Between the high- and low-pressure turbines, these distribution means are carried by a stator, which is generally a low pressure nozzle consisting of stationary vane bearing angular sectors arranged circumferentially adjacent to form a distribution ring within the duct, or which is an inter-turbine structural casing which comprises an internal shroud and an outer shroud between which are arranged stationary vanes for distributing the gas stream within the duct.

In the case of a multi-stage turbine, each turbine rotor is generally made up of an assembly of annular discs and shrouds bolted to each other, the shrouds being mounted by bearings on a structural internal casing of the turbomachine, or in relation to each other in the case of shrouds not belonging to the same turbine.

The structural internal casing, the turbine shrouds, the rectifier angular sectors, or the structural inter-turbine casing, are elements which, due to their proximity to the hot gases coming from the combustion chamber of the turbomachine, can, if not properly cooled, be subject to significant expansion phenomena that can jeopardise the integrity of the turbomachine.

To ensure proper cooling of each turbine, the turbomachine is equipped with a turbine pressurisation and cooling system. This device ensures that the internal clearances of these elements are controlled and that hot gases from the duct do not flow back into them.

In such a device, air is collected from the high-pressure compressor and then conveyed inside the stator, via vanes of the low-pressure distributor or via arms of the inter-turbine casing, to a first internal enclosure which is delimited inside the stator, axially between a high-pressure turbine and a low-pressure turbine of the turbomachine and which communicates with a second internal enclosure. The first internal enclosure may be formed in an inter-turbine structural casing or may be delimited by the shrouds and discs of one of the turbines. The air that has passed through the low-pressure nozzle or the inter-turbine casing is, for example, introduced into the first enclosure delimited by the inter-turbine casing or the low-pressure distributor between the high- and low-pressure turbines, and from there it is used to ventilate various casings of the turbomachine and the internal structural casing and, by communicating with at least a second internal enclosure arranged inside the rotor of one of the turbines, for example the low-pressure turbine, to rise towards the disc or discs of this rotor in order to supply leaks or drains arranged at the junction of the rotor and to prevent the re-introduction of hot gases which circulate in the primary duct towards the interior of the turbine. The re-introduction of hot gases would damage the integrity of the turbine discs. Pressurised air is also used to cool the turbine vanes, which are subject to very high temperatures.

Conventionally, passages with fixed cross sections are arranged between the first enclosure and second enclosure. These passages consist of diaphragms or injectors. These passages allow the control of overpressure in the internal casing, the bleed between the rotor and the diffuser, and the cooling of the various turbine components, thus ensuring the physical integrity of the engine. Such passages are described in FR-3,072,414-A1.

When it comes to cooling the low-pressure turbine, the injectors are generally made in the form of holes which are made in a stationary shroud of the low-pressure turbine and which allow the passage of air from the first enclosure, supplied with pressurised air by the high-pressure compressor, to the second enclosure, and in particular to the turbine discs. The axis of these holes is generally parallel to the axis of the turbomachine.

A part of the low-temperature pressurised air from the high-pressure compressor is thus collected via a collection pipe and conveyed to the first enclosure. For this purpose, a part of the collection pipe passes through, for example, a vane of the distributor of the low-pressure turbine or an arm of the inter-turbine casing. From the first enclosure, it is then injected via the injectors into the second enclosure to rise towards the discs, to cool them, and to push back the hot gases coming from the primary duct.

The dimensioning of the injectors is of capital importance. Indeed, air-collecting from the high-pressure compressor reduces the engine's performance and requires the compressor to be oversized in order to ensure sufficient air flow for combustion.

With a fixed cross-section injector, the air-collecting is calibrated on the most penalising flight point of the turbomachine, which corresponds to the case where the pressure ratio between the upstream and downstream of the injector is the lowest, including in the event of the turbomachine failure. For the other flight points, the disc cooling or bleed rates are therefore higher than the minimum values required, so that more air is taken from the high-pressure compressor than is necessary. The air thus superfluously diverted to the second enclosure is the air that does not circulate in the primary duct and the production of which has consumed part of the turbomachine's power in a purely wasteful manner.

To remedy these drawbacks, variable section injectors have been proposed in documents WO-2015/026597 A1, FR-3,061,739-A1, U.S. Pat. No. 3,972,181-A, GB-2,246, 836-A and EP-1,632,649-A2. However, all these injectors either require active control or do not offer any progressivity.

SUMMARY OF THE INVENTION

The invention remedies this disadvantage by proposing a device for ventilating and pressurising a turbine rotor of a turbomachine, comprising variable cross-section injectors enabling the flow rate of air collected to be regulated.

The proposed solution allows to limit the above-mentioned disadvantages by modulating the cross-section of the injectors according to the operating point of the engine.

To this end, the invention concerns an aircraft turbomachine comprising at least one high-pressure compressor, a high-pressure turbine, a low-pressure turbine, a stator arranged axially between the high-pressure turbine and the low-pressure turbine, a rotor of said low-pressure turbine with an axis and carrying vanes, and a device for ventilating and pressurising this rotor comprising at least one collection pipe suitable for collecting a fraction of the air circulating in the high-pressure compressor and of conveying it to a first internal enclosure which is delimited inside the stator, the first enclosure communicating with at least one second internal enclosure delimited by said rotor of the low-pressure turbine, said first and second enclosures being separated at least in part by a stationary shroud of axis A, said device comprising at least one injector passing through said stationary shroud parallel to said axis A and establishing communication between the first and second enclosures, characterized in that the injector has a variable cross-section configured so as to vary progressively in response to a pressure difference between said first and second enclosures.

According to other characteristics of the turbomachine:
- the cross-section varies between a maximum full opening cross-section of the injector and a non-zero minimum cross-section,
- the injector comprises at least one injection orifice passing through said shroud and a shutter configured to progressively shut off said injection orifice in response to said pressure difference,
- the shutter comprises a slide sliding in a plane perpendicular to an axis of the injection orifice, which is capable of progressively obturating said injection orifice, and a means for actuating said slide,
- the means for actuating the slide comprises a first and a second control piston, integral with each of the ends of the slide, the first piston being mounted so as to be movable in a first chamber communicating with the first enclosure and the second piston being mounted so as to be movable in a second chamber communicating with the second enclosure, and the assembly formed by the pistons and the slide is returned elastically towards a position of full opening of the shutter,
- the means for actuating the slide comprises a tubular housing which is attached to the stationary shroud, which comprises on its periphery the injection orifice and a diametrically opposed inlet orifice, the ends of said housing delimiting the first and second chambers which communicate respectively via respective ports with the first and second enclosures and which receive the first and second pistons integral with the slide, the slide comprising a closure wall integral with one of the first and second pistons and arranged in such a way as to be able to mask the inlet orifice in order to obturate the injection orifice, the second piston also being returned to the position of full opening of the shutter by a spring housed in the second chamber,
- the shutter comprises an element made of a material having a high coefficient of thermal expansion, which is capable of progressively obturating said injection orifice, said expansion accompanying an increase in the pressure difference between said first and second enclosures,
- the stationary shroud comprises a plurality of injectors distributed angularly in a uniform manner over the same diameter of said stationary shroud,
- the stator comprises arms connecting an internal shroud of said stator to an outer shroud of said stator and at least a part of the collection pipe is formed within one of said arms.

BRIEF DESCRIPTION OF THE FIGURES

Further features and advantages of the invention will become apparent in the course of the following detailed description, for the understanding of which reference is made to the appended drawings in which.

DETAILED DESCRIPTION OF THE INVENTION

Figure 1:
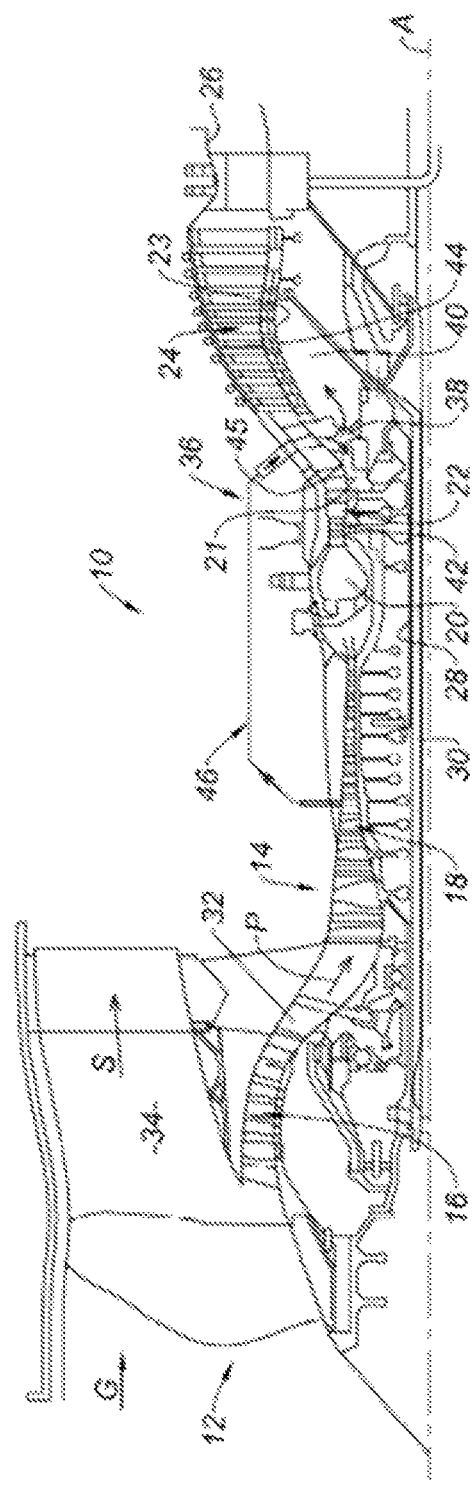
FIG. 1 is a schematic cross-sectional view of a turbomachine comprising a device for ventilating and pressurising a turbine rotor.

A dual flow turbomachine 10 for an axis A of an aircraft is shown in FIG. 1. In a known manner, the turbomachine 10 comprises a fan 12 and a gas turbine engine 14. The gas turbine engine 14 comprises a low-pressure compressor 16, a high-pressure compressor 18, a combustion chamber 20, a high-pressure turbine 22, a low-pressure turbine 24, and an exhaust nozzle 26. The rotor of the high-pressure compressor 18 and the rotor 21 of the high-pressure turbine 22 are connected by a high-pressure shaft 28 and together form a high-pressure (HP) body. The rotor of the low-pressure compressor 16 and the rotor 23 of the low-pressure turbine 24 are connected by a low-pressure shaft 30 and form a low-pressure (LP) body.

The fan 12 draws in an air stream G upstream of the turbomachine.

The gas turbine engine 14 is traversed by a primary gas stream P from the gas stream G. As illustrated by the arrows in FIG. 1, a flow duct 32 of the primary gas stream P thus passes successively through the low-pressure compressor 16, the high-pressure compressor 18, the combustion chamber 20, the high-pressure turbine 22, the low-pressure turbine 24, and the exhaust nozzle 26.

Downstream of the fan 12, a secondary gas stream S flows in a flow duct 34 of the secondary gas stream S and joins the primary gas stream P at the outlet of the nozzle 26 to provide thrust to the turbomachine 10.

The turbomachine 10 comprises in a known manner a device 36 for ventilating and pressurising a rotor 23 of a turbine 24. As shown in FIG. 1, the device 36 provides ventilation and pressurisation of the rotors 21, 23 of the high-pressure 22 and low-pressure turbine 24, but this configuration is not limiting for such a device, which could be dedicated to cooling only one rotor 23. The ventilation and pressurisation device 36 is intended to ensure the cooling of the vane roots (not shown) 42, 44, and in so doing the vanes 42, 44, of the rotors 21, 23 of the turbines 22, 24 and to prevent the intrusion of hot gases from the primary gas duct 32 inside an upstream internal enclosure 38, delimited by the rotor of the high-pressure turbine 22 and a downstream enclosure 40, delimited by the rotor 23 of the low-pressure turbine 24.

As the rotors 21, 23 of the turbines 22, 24 are made up of an assembly of discs and shrouds, the pressurised air rises towards the discs to cool the vanes 42, 44 and their roots (not shown).

Figure 2:
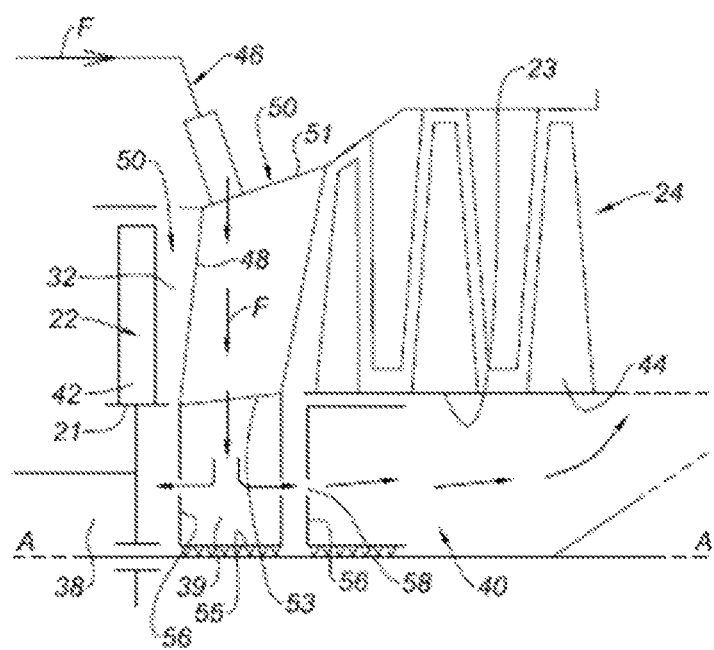
FIG. 2 is a schematic detail view of device for ventilating and pressurising a conventional turbine rotor.

In a known manner and with reference to FIG. 2, this device 36 comprises at least one collection pipe 46 capable of collecting a fraction F of the air circulating in the high-pressure compressor 18 of the turbomachine. For example, in a non-limiting manner, the collection pipe 46 passes through an arm 48 of a stator 50 which generally comprises a plurality of arms 48 connecting an internal shroud 53 of said stator 50 to an outer shroud 51 of said stator 50. The stator 50 may have a function as an inter-turbine casing supporting bearings guiding at least one rotating turbine shaft and/or an aerodynamic function as a distributor for the next stage of turbine vanes. In this case, the arms 48 may be the vanes of this distributor.

In the present case, we are more particularly interested in the cooling of the rotor 23 of the low-pressure turbine 24, this configuration not being limiting of the invention.

In the remainder of this description, a stator 50 is described which is an inter-turbine casing, but this configuration is not limiting of the invention.

The device 36 conveys the fraction F of air taken from the high-pressure compressor 18 to a first internal enclosure 39 which is formed in an internal casing 55 of the stator 50 forming an inter-turbine casing of the turbomachine and which communicates with discs (not shown) and vanes 44 of the rotor 23 of the low-pressure turbine 24.

In this last case in particular, the rotor 23 of the low-pressure turbine 24 comprises leaks which allow the fraction of the pressurised air F to pass from a second internal enclosure 40 of the turbomachine, which is here the downstream enclosure 40 delimited by the rotor of the low-pressure turbine 24, towards the duct 32, in order to cool the vanes 44 and to prevent the hot gases flowing backwards in the duct 32 from penetrating the interior of the casings of the turbomachine.

The first and second enclosures 39, 40 are separated, at least in part, by a stationary shroud 56 of axis A. In FIG. 2, the stationary shroud 56 is a shroud of a stator of the low-pressure turbine 24. However, this configuration is not limiting to the invention and it could be part of the stator or inter-turbine casing 50.

Conventionally, the communication between the first and second enclosures 39, 40 is ensured by at least one injector 58 consisting of a hole of fixed section made in the shroud 56.

This configuration has many disadvantages.

In fact, it does not allow to modulate the flow rate of the fraction F of air extracted circulating in the circuit of the cooling device.

The dimensioning of the injectors 58 is of capital importance. Indeed, this must be carried out in such a way as to guarantee a sufficient supply of air to the second enclosure 44 even when the pressure ratio between upstream and downstream of the injector 58 is the lowest, which corresponds to a flight point of the turbomachine 10 associated with high rotation speeds of the high-pressure compressor, for example for cruising or take-off speeds.

Outside of this flight point, the pressure ratio between the upstream and downstream of the injector 58 is higher, and therefore the air-collecting from the high-pressure compressor 18 is partly superfluous. The reason for this is that at the other flight points, the disc cooling or bleed rates are higher than the minimum values required, so that more air is drawn from the high-pressure compressor than is necessary. The air thus superfluously diverted to the first enclosure is air that does not circulate in the primary duct and whose production has consumed part of the turbomachine's power in pure waste. This collection therefore reduces the performance of the turbomachine 10.

However, this superfluous collection requires the high-pressure compressor 18 to be oversized in order to nevertheless ensure a sufficient air flow rate to supply the combustion. As a result, this collection also has the disadvantage of unnecessarily increasing the overall mass of the turbomachine.

The invention remedies this disadvantage by proposing an injector 58 with a variable cross-section allowing the flow rate of the collection of the gas fraction F to be modulated.

Figure 3:
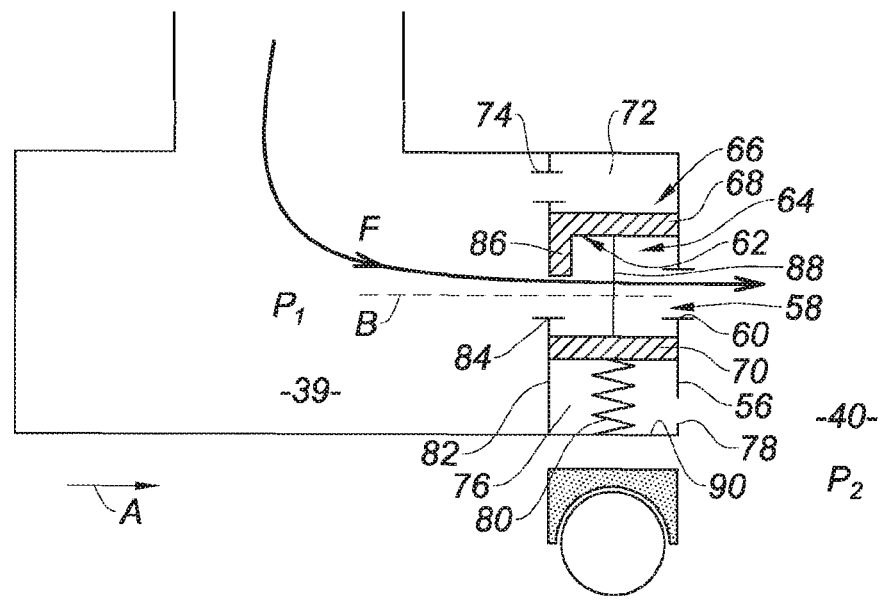
FIG. 3 is a schematic cross-sectional detail view of a stationary turbine shroud equipped with an injector for a device for ventilating and pressurising a turbine rotor according to the invention, shown in a first position.
Figure 4:
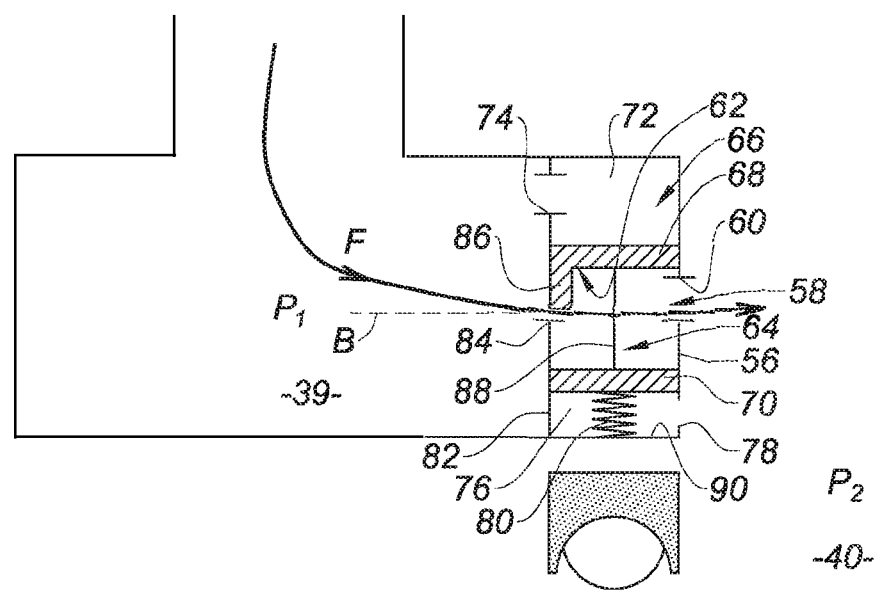
FIG. 4 is a schematic view of the shroud and the injector previously shown in FIG. 3, seen in a second position.

FIGS. 3 and 4 show schematically an injector 58 made in accordance with the invention. The schematic representation does not prejudge the positioning of the injector 58 on the shroud 56 of the low-pressure turbine or on the inter-turbine casing described above.

In accordance with the invention, as illustrated in FIGS. 3 and 4, the device 36 comprises, as before, at least one injector 58 passing through the stationary shroud 56 along an axis B parallel to the direction of the axis A and establishing communication between the first and second enclosures 39, 40, with the difference that this injector 58 has a variable cross-section configured to vary progressively in response to a pressure difference between the first and second enclosures 39, 40.

The cross-section of the injector 58 is likely to vary as a function of the pressure difference between the pressure P1 prevailing upstream in the enclosure 39 and the pressure P2 prevailing downstream in the enclosure 40. This cross-section varies between a maximum full opening cross-section, represented in FIG. 3, and a reduced opening cross-section represented in FIG. 4. Preferably, the reduced opening cross-section corresponds to a non-zero minimum cross-section and thus the injector 58 is not completely obstructed in this position.

More particularly, as illustrated in FIGS. 3 and 4, the injector 58 comprises at least one injection orifice 60 passing through the shroud 56 and a shutter 62 which is configured to progressively shut off this injection orifice 60 in response to said pressure difference between the pressure $P_1$ in the first enclosure 39 upstream of the injector 58 and the pressure $P_2$ in the second enclosure 40 downstream of the injector 58.

More particularly, the shutter 62 comprises a slide 64 which is mounted so as to slide in a plane perpendicular to an axis B of the injection orifice 60, and which is able to progressively obturate the injection orifice 60. The slide 64 is moved by a means 66 for actuating this slide 64.

The means 66 for actuating the slide 64 is intended to ensure the sliding of the slide 64 according to the pressure difference between the first and second enclosures 39 and 40. To do this, it must necessarily be subjected to the pressures P1 and P2 prevailing in these two enclosures 39, 40.

To this end, the means 66 for actuating of the slide comprises a first and a second control piston 68, 70, integral with the slide 64, which are both mounted so as to slide simultaneously perpendicular to the axis B of the injection orifice 60. Each control piston 68, 70 is integral with one end of the slide 64. The first piston 68 is movably mounted in a first chamber 72 communicating with the first enclosure 39 via a port 74 and the second piston 70 is movably mounted in a second chamber 76 communicating with the second enclosure 40 via a port 78.

The assembly formed by the pistons 68, 70 and the slide 64 is elastically returned to a position of full opening of the shutter 62 by an elastic return means 80.

Figure 6:
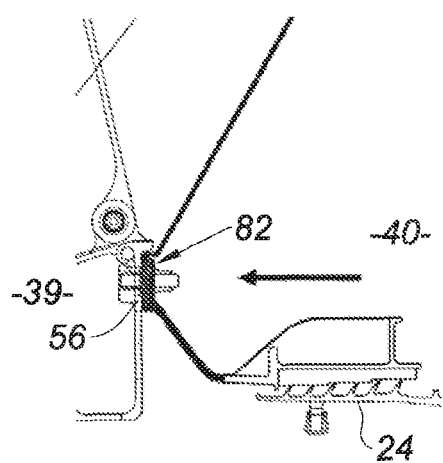
FIG. 6 is a schematic cross-sectional view of the stationary turbine shroud of FIG. 5.

More particularly, the means 66 for actuating the slide 64 comprises a tubular housing 82 which is attached to the stationary shroud 56, and which comprises on its periphery the injection orifice 60 and a diametrically opposed inlet orifice 84. The ends of the tubular housing 82 delimit the first and second chambers 72, 76 which communicate respectively via their respective ports 74, 78 with the first and second enclosures 39, 40 and which receive the first and second pistons 68, 70 integral with the slide 64. The tubular housing 82 is not necessarily cylindrical in cross-section, but may have a flattened rectangular cross-section of small axial dimensions, as shown in FIG. 6.

The slide 64 comprises a closure wall 86 integral with the first piston 68 which conforms to a part of the internal wall of the tubular housing 82, this part of the internal wall of the tubular housing 82 comprising the inlet orifice 84.

In this way, the closure wall 86 is capable of masking the inlet orifice 84 in order to consequently obturate the orifice 60 of the injector 58.

The slide 64 also comprises a connecting rod 88 for linking the two pistons 68, 70. Finally, the return means 80 is constituted by a spring 80 forming the return means which is housed in the second chamber 76 between a bottom 90 of this chamber 76 and the second piston 70.

In this way, the slide 64 is subjected to the pressure difference between the first piston 68 and the second piston 70. It is therefore the difference between the pressure $P_1$ in the first enclosure 39 and the pressure $P_2$ in the second enclosure 40 that ensures the mobility of the slide 64.

According to an alternative embodiment (not shown) of the invention, the shutter could comprise an element made of a material having a high coefficient of thermal expansion, which is capable of progressively obturating said injection orifice, said expansion accompanying, in a known manner, an increase in the pressure difference between said first and second enclosures 39, 40.

However, this technical solution is not preferred by the invention.

Figure 5:
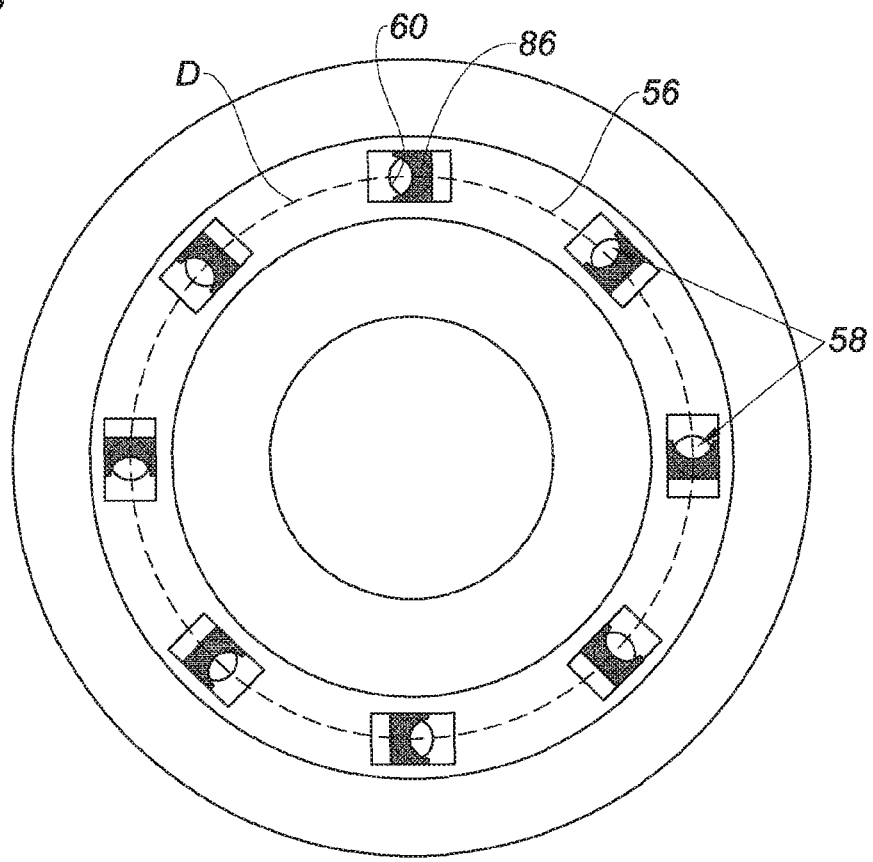
FIG. 5 is a schematic view of a stationary turbine shroud equipped with a plurality of injectors.

As illustrated in FIG. 5, the stationary shroud 56 comprises a plurality of injectors 58, the closure walls 86 of which have been shown, distributed angularly in a uniform manner over the same diameter D of the stationary shroud 56. This configuration guarantees a good balance of the masses of the shroud 56 when the injection orifices 60 are made, and furthermore this design comprising a plurality of injectors 58 allows, preferably a limited number of injectors 58, to ensure the operation of the device in the event of failure of one or more of the injectors 58. In this case, any flow adjustment defect by a failing injector 58 will be spontaneously compensated by the other injectors 58.

The invention is therefore applicable to an aircraft turbomachine comprising at least one turbine, whether it is a high- or low-pressure turbine.

A turbomachine equipped with such a ventilation and pressurisation device 36 allows, in particular, to limit the variations in the ventilation flow rate during the various operating phases of the turbomachine. In particular, it allows to adjust the ventilation rates even though the temperature of the turbines of the turbomachine does not follow the operating phases of the latter. For example, during the shutdown or idling phases of the turbomachine following operation at normal speed, the temperature of the turbines continues to rise even though the high-pressure compressor no longer supplies enough air to ensure cooling. The calibration of the injectors 48 to a larger diameter, which can be adjusted during operation by means of the ventilation device 36, allows to ensure adequate ventilation of the enclosure 40 without this leading, during normal operation, to a superfluous flow rate of collection on the high-pressure compressor, which would be detrimental to the efficiency of the turbomachine, since this can be reduced by the variable cross-section injectors. This solution therefore optimises the life of the turbines without penalising the operation of the turbomachine in steady state.

The invention claimed is:

1. An aircraft turbomachine comprising at least one high-pressure compressor, a high-pressure turbine, a low-pressure turbine, a stator arranged axially between the high-pressure turbine and the low-pressure turbine, a rotor of said low-pressure turbine having an axis and carrying vanes, and a device for ventilating and pressurising this rotor comprising at least one collection pipe suitable for collecting a fraction of air circulating in the high-pressure compressor and of conveying it to a first internal enclosure which is delimited internally to the stator, the first enclosure communicating with at least one second internal enclosure delimited by said rotor of the low-pressure turbine, said first and second enclosures being separated at least in part by a stationary shroud having said axis, said device comprising at least one injector passing through said stationary shroud parallel to said axis and establishing communication between the first and second enclosures, wherein the injector has a variable cross-section configured to vary progressively in response to a pressure difference between said first and second enclosures.

2. The turbomachine according to claim 1, wherein the cross-section varies between a maximum full opening cross-section of the injector and a non-zero minimum cross-section.

3. The turbomachine according to claim 1, wherein the injector comprises at least one injection orifice passing through said shroud and a shutter configured to progressively shut off said injection orifice in response to said pressure difference.

4. The turbomachine according to claim 3, wherein the shutter comprises a slide sliding in a plane perpendicular to an axis of the injection orifice, which is capable of progressively obturating said injection orifice, and a means for actuating said slide.

5. The turbomachine according to claim 4, wherein the means for actuating the slide comprises a first and a second control piston, integral with each of the ends of the slide, the first piston being mounted so as to be movable in a first chamber communicating with the first enclosure and the second piston being mounted so as to be movable in a second chamber communicating with the second enclosure, and in that the assembly formed by the pistons and the slide is returned elastically towards a position of full opening of the shutter.

6. The turbomachine according to claim 5, wherein the means for actuating the slide comprises a tubular housing which is attached to the stationary shroud, which comprises on its periphery the injection orifice and a diametrically opposed inlet orifice, the ends of said housing delimiting the first and second chambers which communicate respectively via respective ports with the first and second enclosures and which receive the first and second pistons integral with the slide, the slide comprising a closure wall integral with one of the first and second pistons and arranged in such a way as to be able to mask the inlet orifice in order to obturate the injection orifice, the second piston also being returned to the position of full opening of the shutter by a spring housed in the second chamber.

7. The turbomachine according to claim 3, wherein the shutter comprises an element made of a material having a high coefficient of thermal expansion, which is capable of progressively obturating said injection orifice, said expansion accompanying an increase in the pressure difference between said first and second enclosures.

8. The turbomachine according to claim 7, wherein the stationary shroud comprises a plurality of injectors distributed angularly in a uniform manner over the same diameter of said stationary shroud.

9. The turbomachine according to claim 1, wherein the stator comprises arms connecting an internal shroud of said stator to an outer shroud of said stator and in that at least part of the collection pipe is formed within one of said arms.

* * * * *